Feb. 27, 1962     J. F. EBERLE     3,022,735
SOLID ROCKET PROPELLANTS
Filed Oct. 10, 1957     5 Sheets-Sheet 1
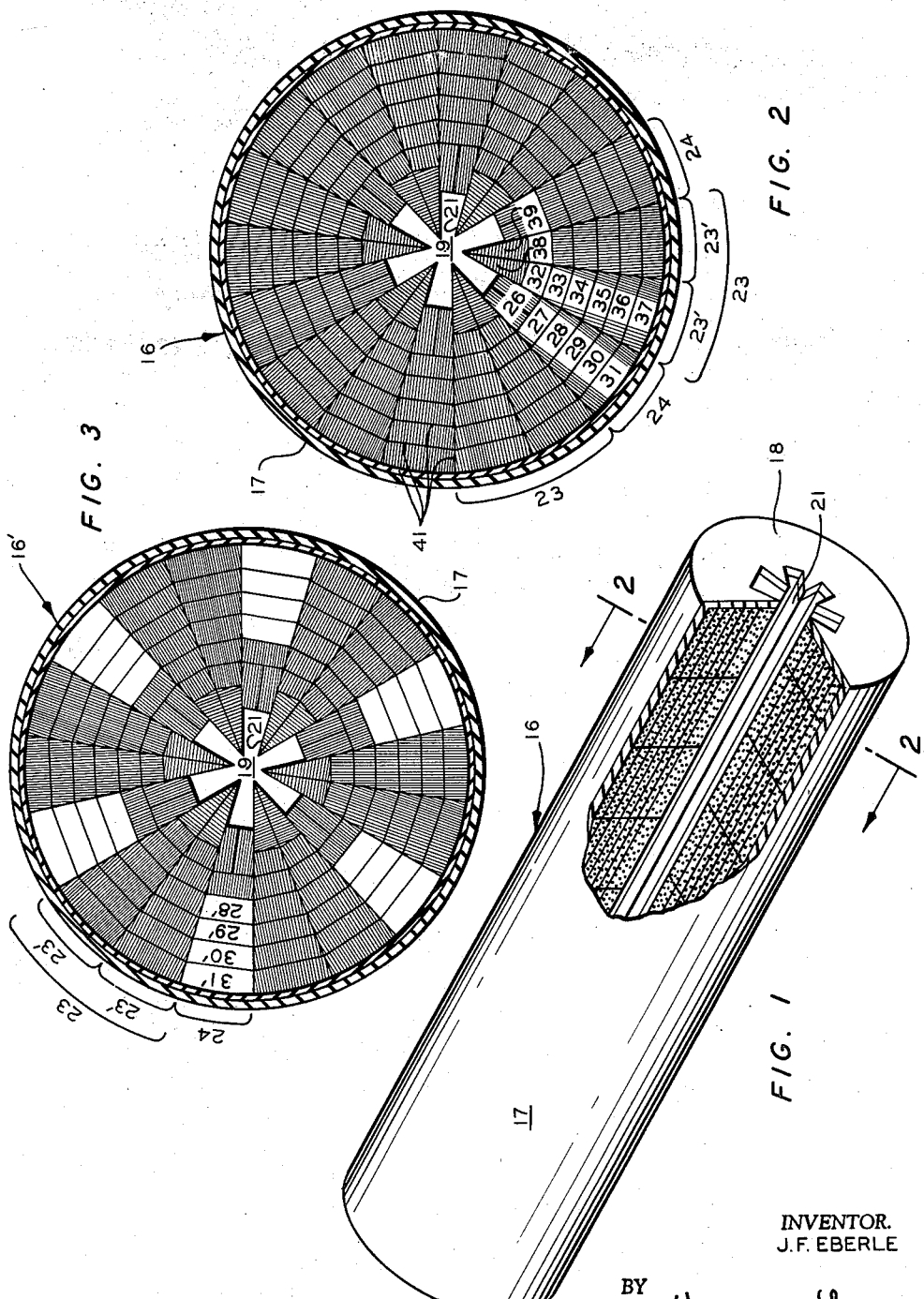
INVENTOR.
J.F. EBERLE
BY Hudson & Young
ATTORNEYS

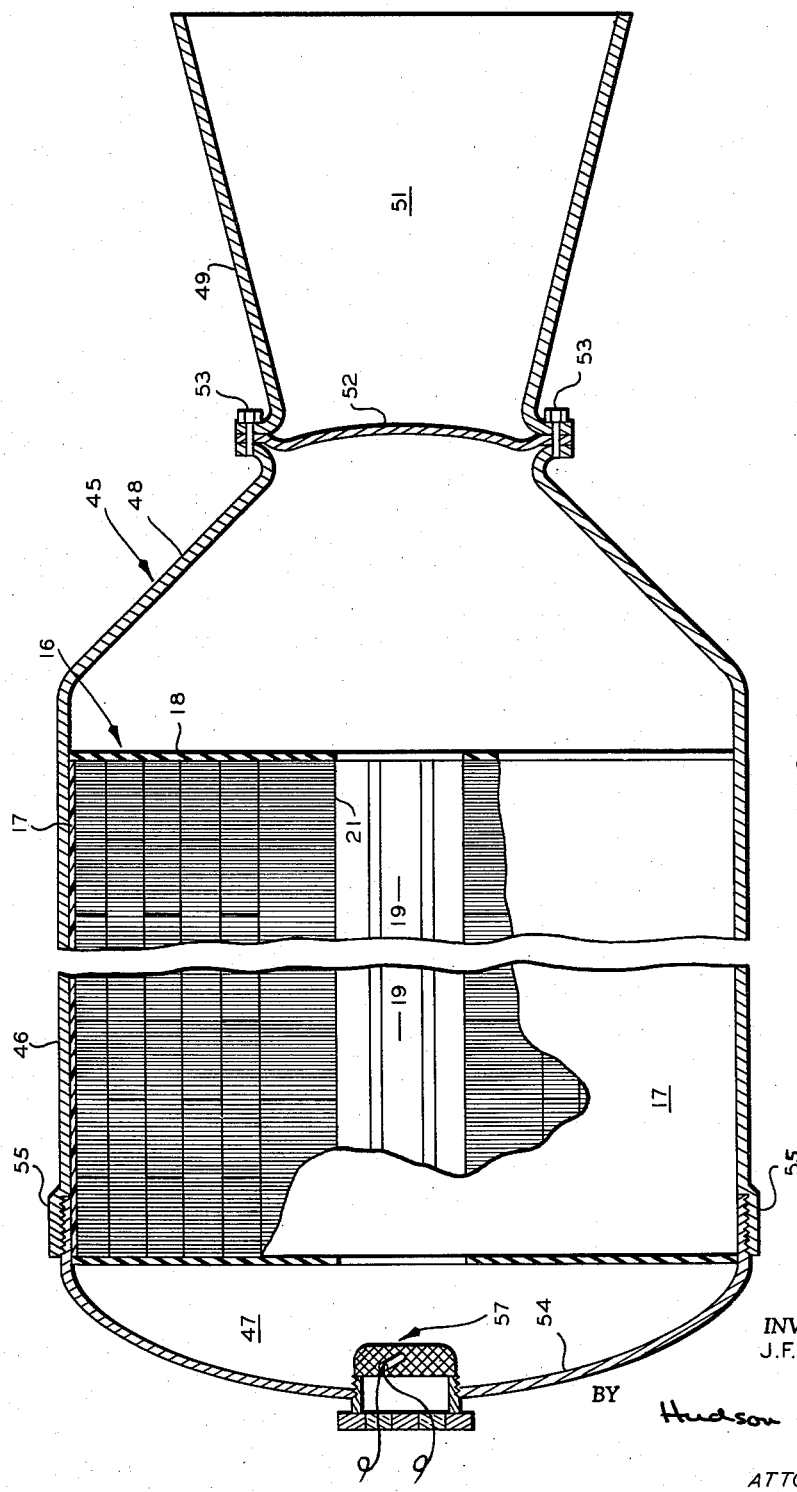

Feb. 27, 1962  J. F. EBERLE  3,022,735
SOLID ROCKET PROPELLANTS
Filed Oct. 10, 1957  5 Sheets-Sheet 4

INVENTOR.
J. F. EBERLE
BY Hudson & Young
ATTORNEYS

INVENTOR.
J.F. EBERLE
BY Hudson & Young
ATTORNEYS

United States Patent Office 3,022,735
Patented Feb. 27, 1962

3,022,735
SOLID ROCKET PROPELLANTS
Jack F. Eberle, Bartlesville, Okla., assignor to Phillips Petroleum Company, a corporation of Delaware
Filed Oct. 10, 1957, Ser. No. 689,448
4 Claims. (Cl. 102—98)

This invention relates to solid rocket propellants. In one aspect it relates to solid rocket propellant charges of novel configurations particularly adapted for use in large rocket motors such as the booster and sustainer types. In another aspect it relates to rocket motors loaded with such solid rocket propellant charges.

Rocket motors utilizing solid propellant may be classified in several categories depending on their size, shape and/or configuration of the charge, and on their utility (i.e., jet-assisted-take-off, booster, sustainer, etc.). Each classification has specific problems relating to its requirements and specifications. The present invention generally relates to those rocket motors utilizing enormous masses of propellant and capable of imparting high total impulses (e.g. 1,000,000 pounds or more). More specifically, this invention is concerned with rocket motors of the booster and sustainer types which involve scale-up problems of fabrication and assembly not generally found in the prior art.

Large sustainer propellant charges cannot feasibly be extruded, molded, or cast in the form of a single grain of propellant material because of the lack of suitable fabricating equipment designed to handle large masses of propellant. As such, sustainer propellant charges are often fabricated from a plurality of bonded smaller grains. Booster propellant charges are generally assembled in the form of multiple propellant grains where advantage is taken of the relatively short duration of burning of these multi-grains and where efficient operation of booster type rocket motors is relatively unhampered by effects of temperature. Because of the problems inherent in fabricating and assembling both of these types of large propellant charges, the rocket motor fabricator or designer is necessarily limited in propellant charge geometry.

In designing large propellant charges, the geometry of the propellant charge should be such that the ideal plateau pressure vs. time curve is approached as nearly as possible. To approach the ideal plateau curve, the rocket motor designer may avail himself of various charge configurations but his approach has generally been limited to variation in the external geometry of the propellant charge.

Due to the enormous masses of propellant used in fabricating sustainer and booster charges, problems are encountered in supporting the charges under severe conditions of inertia and vibration as well as temperature-induced stresses and strains. Many of the proposed propellant charges do not stand up under these conditions. Many of these charges tend to crack or fragment during operation or handling, leading to an undue pressure build-up because of the increased amount of exposed propellant surface available for burning.

Moreover, many of these charges are subject to splintering of propellant, especially in the case of star-perforated cylindrical grains of the sustainer type, near the termination of combustion due to the well known fact that a grain of propellant burns in substantially parallel layers.

Accordingly, an object of this invention is to provide an improved solid rocket propellant design. Another object is to provide a novel solid rocket propellant charge having a novel configuration or geometry particularly adapted for use in large rocket motors such as the booster and sustainer types. Another object is to provide rocket motors of the booster and sustainer types loaded with such novel solid rocket propellant charges. A further object is to provide novel means whereby a rocket designer is able to avail himself of greater latitude in selecting propellant charge configurations. Another object is to provide a solid rocket propellant charge having an increased burning rate and improved structural strength. Another object is to provide a solid rocket propellant charge able to withstand severe conditions of inertia, vibration, and temperature induced stresses and strains. A further object is to provide a solid rocket propellant charge having desirable burning characteristics and a pressure v. time curve which more nearly approaches an ideal plateau pressure v. time curve. Further objects and advantages of this invention will become apparent from the following discussion, appended claims, and accompanying drawing in which:

FIGURE 1 is an isometric view in quarter section of an internal-burning sustainer propellant charge;

FIGURE 2 is an enlarged cross-sectional view of FIGURE 1, taken along the plane indicated;

FIGURE 3 is a view similar to FIGURE 2 illustrating a further embodiment thereof;

FIGURE 4 is an elevational view in cross section of a rocket motor of the sustainer type loaded with the charge of FIGURE 1;

Figure 5:
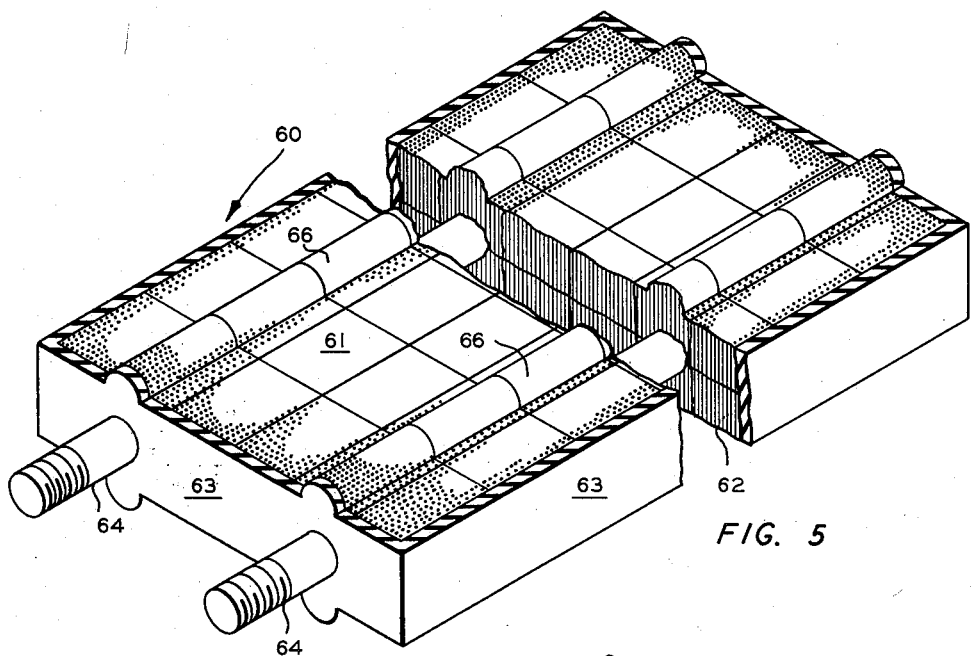
FIGURE 5 is an isometric view of a propellant grain of the double-web type adapted for use in a booster type rocket motor.

Referring now to the drawing, and to FIGURE 1 in particular, a large internal burning tubular grain 16 of the sustainer type is shown having its outer cylindrical surfaces and ends covered with burning restricting material 17, 18 respectively. The grain 16 has an axial perforation 19 which is star-shaped in cross-section; this grain is normally known as a star grain. The perforation 19 is defined by an internal burning surface 21. The propellant mass of grain 16 is built up from a plurality of smaller blocks of propellant, having various shapes and sizes, the individual blocks being bonded together and to the restricting material with suitable adhesive or mortar.

The cross-sectional configuration or geometry of charge 16 is clearly shown in FIGURE 2. The charge 16 is made up from a plurality of circumferentially alternate wedges 23 (which can be made from two identical half-wedges 23') and truncated wedges 24 of propellant material. The sides of both wedges are radial with respect to the longitudinal axis of the charge 16. The star perforation 19 is defined by the exposed inner ends of wedges 23, 24, these exposed surfaces making up the initial burning surfaces 21 of the charge 16. The inner extremities of wedges 23 may be termed the internal star points and the inner extremities of wedges 24 may be termed the external star points. Both types of wedges are themselves made up from a plurality of blocks of propellant material, mainly having generally frusto-rectangular shapes, such as blocks 26–31, inclusive, and 32–37, inclusive, with the inner blocks of wedge 23 having triangular shapes, such as blocks 38, 39. All of these blocks can be bonded together with adhesive, indicated as 41, the outermost blocks, such as 31 and 37, similarly bonded to the outer cylindrical layer of restrictor 17.

Spatially embedded in the propellant material of all the blocks in FIGURE 2 is a plurality of small diameter metal filaments or wires. These wires are parallel and uniformly spaced in each block and are generally oriented in a direction that is normal to the progressively generated burning surface of the charge 16, with the wires in blocks 26, 38 and 39 also normal to initial burning surface 21, as clearly shown in FIGURE 2. The purpose of these wires is to not only increase the burning rate of the propellant but also to control the geometry of the progressively generated burning surface or flame front. These wires also add structural strength to the propellant mass, thereby minimizing formation of cracks and other imperfections.

All of the various shapes of blocks can be made by sawing or otherwise shaping plank-like extrusions of solid propellant with the wires extruded in place in the propellant material. These extrusions can be prepared in various ways. For example, the wires can be passed through a breaker die located just ahead of the extruder die. Or, a plurality of small, propellant coated wires can be passed through holes in the breaker plate and join other propellant material in the die to form a solid extruded plank. Although only two general shapes of blocks are shown in FIGURE 2, it is to be understood that other shapes and sizes of blocks can be used within the scope and spirit of this invention.

In the embodiment in FIGURE 2, all of the blocks of propellant have embedded therein a plurality of parallel and uniformly spaced wires. Alternatively, this type of charge can be modified in the manner illustrated by charge 16' in FIGURE 3. In this latter view, the outer most blocks of truncated wedges, such as blocks 28', 29', 30', and 31', are similar to the corresponding blocks of FIGURE 2 except that these former blocks are not provided with any embedded wires, for purposes hereinafter described.

Referring now to FIGURE 4, a rocket motor generally designated 45 is shown having a shell or cylindrical casing 46 defining in part a combustion chamber 47 in which is loaded the sustainer charge 16 illustrated in FIGURE 1. (Alternatively, this rocket motor could be similarly loaded with charge 16' of FIGURE 3.) The rear or aft end of casing 46 is reduced at 48 and connected to a nozzle portion 49; these members are so constructed as to form a Venturi-like passage 51 for the exhaust of gaseous products from combustion chamber 47. Alternatively, the nozzle portion 49 may be made integral with casing portion 48. A blow-out or starter disc 52 is positioned across passage 51 and can be secured at its periphery between nozzle portion 49 and casing portion 48 by means of bolts 53 or the like. Reduced casing portion 48 can also be fitted with one or more safety plug attachments capable of releasing excessive pressure from the combustion chamber 47 in a manner well known to those skilled in the art. The fore or head portion of casing 46 is preferably constructed in the form of a flange 55 and is secured to a head or closure member 54 by welding or the like after the combustion chamber 47 has been loaded with propellant charge 16. Secured to the head member 54 is an igniter generally designated 57 which is preferably disposed in axial alignment with perforation 19. Igniter 57 can be any of the igniters commonly employed in the rocket art; for example, black powder or other pyrotechnic material contained in a suitable bag or wire mesh container with suitable electro-responsive means, such as squibs or matches embedded therein. Igniter 57 may be fired by the closing of a suitable switch in an electric circuit which leads to a power source external the socket motor and supplies electric energy to the electro-responsive means.

Although I have described and illustrated the sustainer rocket motor of FIGURE 4 loaded with a single, large propellant charge, it is within the scope of this invention to provide a rocket motor loaded with a plurality of such propellant charges, aligned for example in a tandem manner within the combustion chamber.

Referring now to FIGURE 5, a rocket grain 60 is shown having a generally rectangular parallelepiped configuration with its upper surface 61 and lower surface 62 exposed to form two external-burning surfaces (thus forming two webs of propellant). The ends and sides of grain 60 can be covered with burning restricting material 63. Grains 61 can be provided with one or more longitudinally aligned, internal supported rods or members 64, preferably made of metal, having threaded ends which protrude from the ends of grain 60. The exposed burning surfaces are provided with ribs 66 which are likewise unrestricted and form part of said burning surfaces. The total surface area of ribs 66 is equal to or slightly greater than the surface area of the perforations in the propellant material provided for support rods 64.

Grain 60 is made up from a plurality of substantially rectangular bonded blocks of propellant material having a plurality of metal wires or filaments that are parallel and uniformly spaced therein and oriented in a direction substantially normal to the initial and progressively generated burning surfaces of the grain. The plurality of blocks of each grain 60 can be adhesively bonded together with propellant mortar. These blocks of propellant material can be fabricated in a manner similar to those described hereinbefore.

Figure 6:
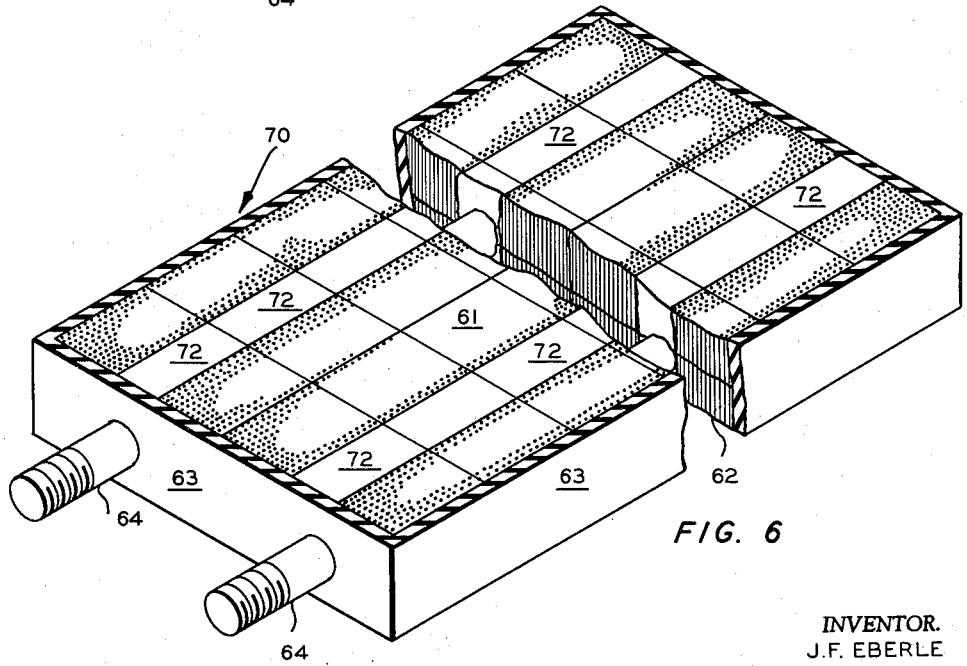
FIGURE 6 is a view similar to FIGURE 5 illustrating another embodiment thereof.

In FIGURE 5 all of the blocks of propellant material are provided with embedded wires. As a modification thereof, the grain 70 illustrated in FIGURE 6 is made up from a plurality of similar blocks of propellant material except that some of the blocks, such as blocks 72 do not have any wires embedded therein. These blocks 72 are arranged in a manner longitudinally and vertically aligned with support rods 64 and generally have a width substantially the same as the diameter of rods 64, for purposes hereinafter described. Note that the modified grain in FIGURE 6 is not provided with any compensating ribs such as ribs 66 of FIGURE 5.

Figure 7:
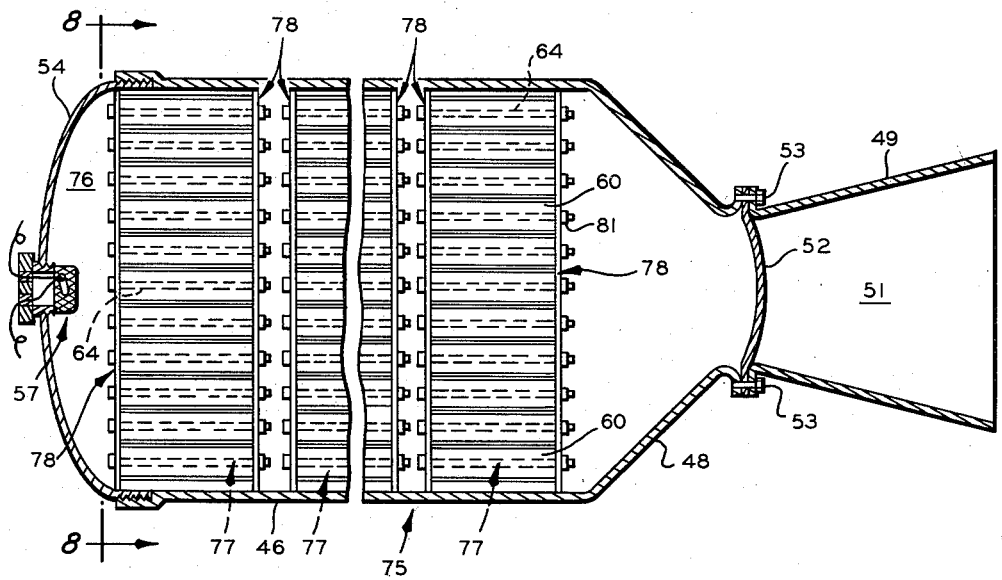
FIGURE 7 is an elevational view in cross-section of a booster type rocket motor loaded with a plurality of the grains illustrated in FIGURE 5.
Figure 8:
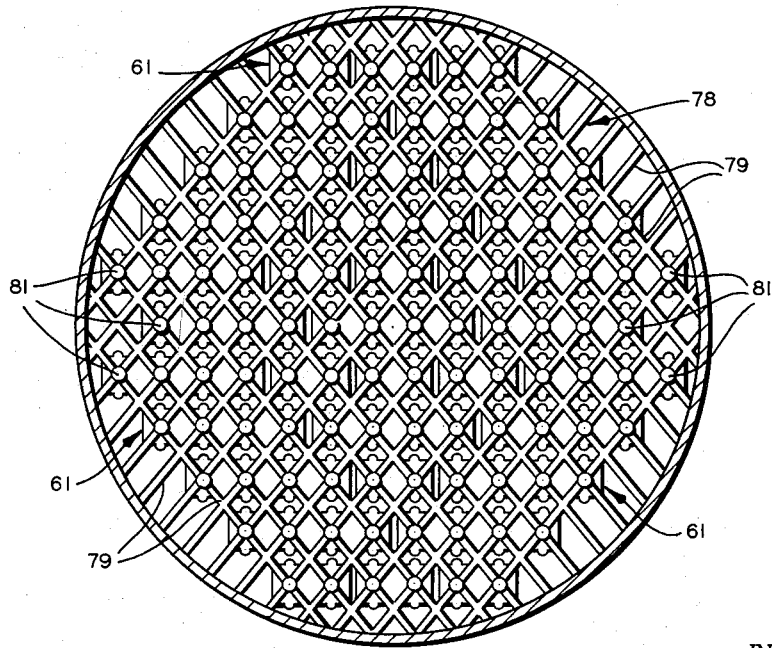
FIGURE 8 is an elevational cross-sectional view of FIGURE 7 taken along the plane indicated.

Referring now to FIGURES 7 and 8, a booster type rocket motor 75 is shown, the combustion chamber 76 of which is loaded with one or more multi-grain propellant charges 77, each charge made up of a plurality of double-web grains such as grain 60 of FIGURE 5. Grain 60 are longitudinally mounted in combustion chamber 76 in spaced relationship with respect to each other in order that the burning of the grains can occur on the two exposed burning surfaces. Grains 60 are supported at their ends by a support grid 78 made of crossing bars 79 as shown more clearly in FIGURE 8. The grains 60 are attached to support grids 78 by the threaded ends of the support members 64 protruding from the ends of the individual grains 60. These threaded ends extend through holes at the inner section of bars 79 and are attached thereto by nuts 81. In other respects, rocket motor 75 is similar to that shown in FIGURE 4.

The wires or filaments promote the burning rate of the propellant materials in which they are embedded. Laboratory experimentation and high-speed photography have demonstrated that the burning rates of strands of composite propellant, wherein the oxidizers were ammonium nitrate, ammonium perchlorate, and the like, were from three to five times faster along the filaments than on the normal burning surfaces. The increased burning rate (inches per second) along the filaments is probably due to the rapid transport of heat from the flame zone at the burning surface of the grain through the wire to the unburned propellant material. High thermal diffusivity and high melting temperature of the wires will produce faster burning rates along the wires. The burning of the propellent material will take place at a more rapid rate immediately adjacent the wires and thereby will form intersection craters in the propellant, each crater being similar to that formed by a burning candle near the wick. As the craters form, the available burning surface area is increased with increase in the mass and linear burning rates of the propellant material.

Since the burning rates of grains can be increased by embedding parallel and uniformly spaced wires in a direction normal to the progressively generated burning surfaces of the grains, grains can be fabricated having a greater web thickness for a given duration than that heretofore possible. This means that greater structural strength can be imparted to grains having thin webs and a smaller burning surface area can be tolerated in a rocket motor while still obtaining the same motor burning rate (lbs./sec.). Such a propellant-charged rocket motor would be easier to ignite. A propellant fabricator or rocket motor designer upon being acquainted with my invention will be able to utilize propellant materials with a wider range of burning rates than available heretofore and less stringent restrictions will be placed upon their design possibilities.

The wires can be made of any heat conducting metal such as aluminum, magnesium, steel, platinum, copper, silver, tungsten, and the like. The diameter of the wires can vary but generally will be in the range between 0.001 to 0.05 inch or smaller, depending on weight limitations, etc. The spacing between wires can also vary according to the thickness of the propellant web, etc.; for example, the spacing can be between 2/10 to 9/10 inch or proportionally larger or smaller. In general, the spacing will be such that the craters formed around the wires during burning of the propellant material will touch or overlap so that less sensitivity to pressure changes can be imparted to the propellant grain once a stable burning surface has been established. In fact, the burning surface of the grain can have preformed craters around the wires.

The propellant material utilized in fabricating the rocket grains of this invention can be prepared from a variety of known compounding materials. Particularly useful propellant compositions which may be utilized in the practice of this invention are of the rubbery copolymer-oxidizer type which are plasticized and worked to prepare an extrudable mass at 130° to 175° F. The copolymer can be reinforced with suitable reinforcing agents such as carbon black, silica, and the like. Suitable oxidation inhibitors, wetting agents, modifiers, vulcanizing agents, and accelerators can be added to aid processing and to provide for the curing of the extruded propellant grains at temperatures preferably in the range of 170°–185° F. In addition to the copolymer binder and other ingredients, the propellant composition comprises an oxidizer and a burning rate catalyst. The resulting mixture is heated to effect curing of the same.

Solid propellant compositions particularly useful in the preparation of the propellants used in this invention are prepared by mixing the copolymer binder with a solid oxidizer, a burning rate catalyst, and various other compounding ingredients so that the reinforced binder forms a continuous phase and the oxidizer a discontinuous phase. The resulting mixture is heated to effect curing of the same.

The copolymers are preferably formed by copolymerization of a vinyl heterocyclic nitrogen compound with an open chain conjugated diene. The conjugated dienes employed are those containing 4 to 6 carbon atoms per molecule and representatively include 1,3-butadiene, isoprene, 2,3-dimethyl-1,3-butadiene, and the like. The vinyl heterocyclic nitrogen compound generally preferred is a monovinylpyridine or alkyl-substituted monovinylpyridine such as 2-vinylpyridine, 3-vinylpyridine, 4-vinylpyridine, 2-methyl-5-vinylpyridine, 5-ethyl-2-vinyl-pyridine, 2,4-dimethyl-6-vinlypyridine, and the like. The corresponding compounds in which an alpha-methylvinyl (isopropenyl) group replaces the vinyl group are also applicable.

In the preparation of the copolymers, the amount of conjugated diene employed is in the range between 75 and 95 parts by weight per 100 parts monomers and the vinyl heterocylic nitrogen is in the range between 25 and 5 parts. Terpolymers are applicable as well as copolymers and in the preparation of the former up to 50 weight percent of the conjugated diene can be replaced with another polymerizable compound such as styrene, acrylonitrile, and the like. Instead of employing a single conjugated diene compound, a mixture of conjugated dienes can be employed. The preferred, readily available binder employed is a copolymer prepared from 90 parts by weight of butadiene and 10 parts by weight of 2-methyl-5-vinylpyridine, hereinafter abbreviated Bd/MVP. This copolymer is polymerized to a Mooney (ML-4) plasticity value in the range of 10–40, preferably in the range of 15 to 25, and may be masterbatched with 5–20 parts of Philblack A, a furnace black, per 100 parts of rubber. Masterbatching refers to the method of adding carbon black to the latex before coagulation and coagulating to form a high degree of dispersion of the carbon black in the latex. Marasperse-CB, or similar surface active agent, is added to the carbon black slurry or to the water used to prepare the slurry.

The following empirical formulation or recipe generally represents the class of propellant compositions preferred for the preparation of the propellant grains of this invention.

Table I

| Ingredient | Parts per 100 parts of rubber | Parts by weight |
| --- | --- | --- |
| Binder: | | 10–25 |
|    Copolymer (Bd/MVP) | 100 | |
|    Philblack A (a furnace black) | 10–30 | |
|    Plasticizer | 10–30 | |
|    Silica | 0–20 | |
|    Metal oxide | 0–5 | |
|    Antioxidant | 0–5 | |
|    Wetting agent | 0–2 | |
|    Accelerator | 0–2 | |
|    Sulfur | 0–2 | |
| Oxidizer (ammonium nitrate) | | 75–90 |
| Burning rate catalyst | | 0–30 |

The binder material can also be Thiokol rubber, GR-S rubber, and terpolymers of monomers such as butadiene, methylvinylpyridine, acrylonitrile, styrene, and the like. Other applicable oxidizers include guanidine nitrate, nitroguanidine, ammonium dichromate, potassium perchlorate and the like. Generally, I prefer to use solid inorganic oxidizing salts such as the ammonium, alkali metal, and alkaline earth metal salts of nitric, perchloric, and chloric acids.

A number of particular useful castable propellant formulations are those employing ammonium perchlorate as an oxidizer and a series of polysulfide liquid polymers such as LP-2, LP-3, and LP-8, prepared by the Thiokol Corp., as binders. One suitable castable formulation is set forth in the following table.

Table II

| Ingredient: | Weight percent |
| --- | --- |
| Ammonium perchlorate | 40–60 |
| LP-3 [1] | 35–55 |
| p-quinone dioxime | 1–5 |
| Diphenyl guanidine | 1–3 |
| Sulfur | 1–3 |

[1] A liquid polysulfide polymer.

The adhesive or mortar used to bond the individual blocks of propellant together and to the restricting material is a self-combustible material, like the solid propellant itself. The usual rubber base cements are not particularly applicable since their burning rates are so slow that for all intents and purposes they are incombustible and do not possess the desirable resiliency. The mortars used in this invention should preferably have burning rates which are approximately the same as the average burning rate of the composite propellant charge, or for a more refined charge the mortar's burning rate can be adapted to that of contiguous blocks of propellant. These mortars preferably comprise a compatible rubbery binder, preferably liquid in its uncured state, with a low oxidizer content incorporated therein. A series of particularly useful rubbery binders are the aforementioned polysulfide liquid polymers made by the Thiokol Corporation. When these polymers have ammonium perchlorate incorporated therein (which oxidizer has a higher percentage of oxygen than ammonium nitrate), low oxidizer loadings must be utilized to limit the burning rate to the desirable range of 0.1 to 0.2 inch/sec. These mortar formulations are characterized by their high resiliency due to the nature of the rubbery binder and their relatively low oxidizer content; therefore, when these mortars are used to bond the individual blocks, the composite propellant charge is less susceptible to the effects of shock and temperature-induced forces. Suitable mortar formulations having burning rates in the range between about 0.1 and 0.2 inch/sec., which formulations can also be used to prepare castable propellant mixtures, are set forth in Table II. After the mortar is applied to the individual blocks of propellant desired to be bonded, and the entire charge is assembled, the mortar and the propellant are cured simultaneously at elevated temperatures, e.g., 170°–185° F.

The layer of restricting material can be made from any of the slow burning materials used for this purpose in the art, such as cellulose acetate, ethylcellulose, butadiene-methylvinylpyridine copolymer, GR-S, and the like.

Figure 9:
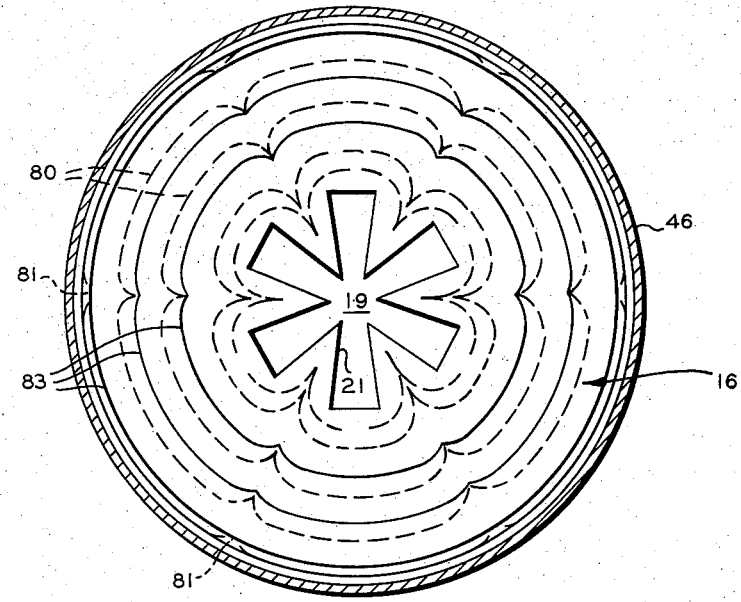
FIGURE 9 is a diagrammatic view illustrating the progressively generated burning surfaces of a sustainer type propellant charge.

In the operation of the rocket motor shown in FIGURE 4, upon firing of igniter 57 hot igniter decomposition products are generated and these products propagate through the combustion chamber 47, preferentially down through the axial perforation 19. The heat from the igniter decomposition products is transferred to the exposed burning surface 21 of charge 16, raising the temperature thereof to an ignition temperature. As a result, burning or combustion of the propellant mass is initiated with the resultant generation of combustion gases. The combustion chamber pressure rises and at a predetermined pressure the blow-out disc 52 is ruptured or otherwise fractured and the combustion products escape at a high velocity from the rocket motor combustion chamber 47 via Venturi-like passage 51, thereby imparting thrust to the rocket motor. The progressively generated burning surfaces of charge 16 are clearly shown in FIGURE 9, as indicated by the broken lines 80. Since the wire filaments increase the burning rate of the propellant material adjacent the wires, the propellant mass will be consumed more readily and a greater volume of gases will be generated in a shorter duration than that heretofore obtained. Note that the progressively generated burning surfaces 80 are defined by alternating or circumferentially spaced peaks or cusps radially opposite the initial internal star points and valleys or dips radially opposite the external star points. As a result of the internal star perforation, near the termination of burning (at that point in the burning cycle when substantially all of the propellant mass has been consumed), there is left remaining residual amounts of propellant material in the form of splinters or slivers 81. While the occurrence of splinters is not desired, the residence time of these splinters is shorter than that possible heretofore because of the increased burning rate of the wire-embedded propellant mass. With the modification of the charge 16' shown in FIGURE 3, the occurrences of splintering is substantially obviated or minimized. This is because when the progressively generated burning surface 83 reaches the blocks of propellant not provided with embedded wires, such as blocks 28', 29', and 30' and 31' in the truncated wedges 24 of FIGURE 3, the propellant material radially opposite the initial external star points burns at a relatively slower rate than the propellant material radially opposite the initial internal star points. As a result, the progressively generated burning surfaces 83 smooth out, as indicated by the increasing concentric full lines in FIGURE 9. Since a sustainer rocket designer will be able to control the geometry of the progressively generated burning surface according to my invention, he will have greater latitude in selecting and designing sustainer charges.

Figure 10:
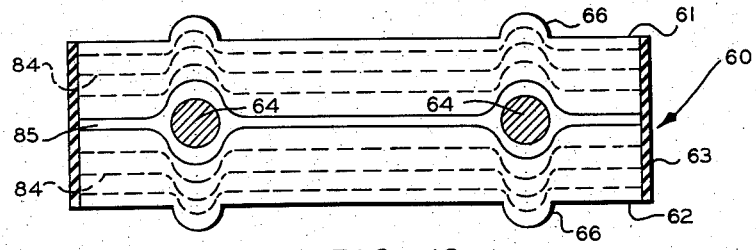

In the operation of the rocket motor illustrated in FIGURE 7, the propellant material in each grain 60 starts to burn on the two exposed burning surfaces. The propellant material of each grain 60 is thus consumed from both sides in substantially parallel layers as shown by the progressively generated burning surfaces 84. As shown in FIGURE 10, near the termination of the burning cycle, a thin layer 85 of propellant remains supported by the support rods 64. However, since the burning rate of this propellant is faster than that which would be obtained without the use of embedded wires, the residence time of this thin layer 85 of propellant is relatively short and substantial consumption of this thin layer of propellant will occur substantially before it breaks up and falls away from the support rods.

Figure 11:
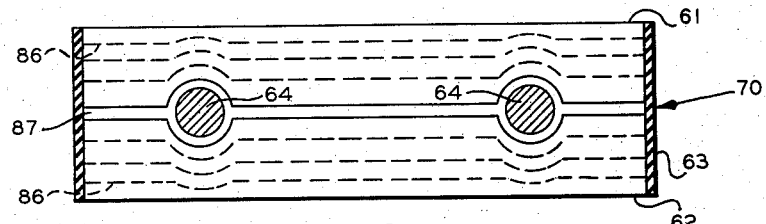
FIGURES 10 and 11 are diagrammatic views illustrating the progressively generated burning surfaces of the booster type double-web grains illustrated in FIGURES 5 and 6, respectively.

When the modified grains of FIGURE 6 are consumed, the progressively generated burning surfaces, represented by 86 in FIGURE 11, are controlled so that the near end of the period of propellant consumption only a short-lived, thin layer 87 of propellant remains. This results due to the fact that the propellant material in longitudinal and vertical alignment with rods 64 has a relatively slower burning rate than the propellant material between the two rods and between the rods and the size of the grain.

In the case of double-web grains, the booster rocket designer can control the geometry of the progressively generated burning surfaces according to this invention, as well as insure minimization of splintering or fragmentation near the end of the period of propellant consumption.

Various modifications of my invention can be made by those skilled in the art without departing from the scope and spirit of my invention, and it is to be understood that the foregoing discussion and drawings are merely illustrative of my invention and do not unduly limit the same.

I claim:

1. A cylindrical rocket grain of the sustainer type comprising a plurality of bonded, imperforate blocks of propellant of the composite type comprising ammonium nitrate and a rubbery copolymer of 1,3-butadiene and 2-methyl-5-vinylpyridine, the outer cylindrical surface and ends of said grain being covered with restricting material, said grain having an axial perforation which is star-shaped in cross-section, said perforation being defined by an exposed initial burning surface of said grain, said blocks of propellant assembled to form circumferentially alternate wedges and truncated wedges, a plurality of thin, parallel metal wires uniformly spaced and embedded in at least a portion of said blocks of propellant, said wires adapted to control the geometry of the progressively generated burning surfaces of said grain, all of said wires oriented in a direction substantially normal to said progressively generated burning surfaces.

2. A rocket grain according to claim 1 wherein all of said blocks of propellant are provided with said wires.

3. A rocket grain according to claim 1 wherein all of said blocks making up said wedges are provided with said wires, and only the inner blocks making up said truncated wedges are provided with said wires.

4. A cylindrical rocket grain comprising a plurality of bonded, imperforate blocks of propellant of the composite type comprising a solid inorganic oxidizing salt and a rubbery binder, the outer cylindrical surface and ends of said grain being covered with restricting material, said grain having an axial perforation which is star-shaped in cross-section, said perforation being defined by an exposed initial burning surface of said grain, said blocks of propellant assembled to form circumferentially alternate wedges and truncated wedges, a plurality of thin, parallel metal wires uniformly spaced and embedded in at least a portion of said blocks of propellant, said wires adapted to control the geometry of the progressively generated burning surfaces of said grain, all of said wires oriented in a direction substantially normal to said progressively generated burning surfaces.

References Cited in the file of this patent

UNITED STATES PATENTS

| | | |
|---|---|---|
| 726,901 | Gathmann | May 5, 1903 |
| 1,301,381 | Buckingham | Apr. 22, 1919 |
| 1,530,692 | Paulus | Mar. 24, 1925 |
| 2,703,960 | Prentiss | Mar. 15, 1955 |
| 2,813,487 | Miller et al. | Nov. 19, 1957 |
| 2,816,418 | Loedding | Dec. 17, 1957 |
| 2,853,946 | Loedding | Sept. 30, 1958 |
| 2,857,258 | Thomas | Oct. 21, 1958 |
| 2,877,504 | Fox | Mar. 17, 1959 |

FOREIGN PATENTS

| | | |
|---|---|---|
| 15,363 | Great Britain | July 1, 1909 |
| 652,542 | Great Britain | Apr. 25, 1951 |

OTHER REFERENCES

A Quasi-Morphological Approach to the Geometry of Charges for Solid Propellant Rockets: The Family Tree of Charge Designs by J. M. Vogel, published in Jet Propulsion, February 1956, pp. 102–105.